(12) United States Patent
Huang (10) Patent No.: US 10,378,957 B2
(45) Date of Patent: Aug. 13, 2019

(54) SYSTEM AND METHOD FOR MEASURING COAL BURNER FLAME TEMPERATURE PROFILE USING OPTICAL DEVICE

(71) Applicant: Safe-Fire Technology LLC, Plano, TX (US)

(72) Inventor: Zhigao Huang, Melbourne (AU)

(73) Assignee: SAFE-FIRE TECHNOLOGY LLC, Plano, TX (US)

( * ) Notice: Subject to any disclaimer, the term of this patent is extended or adjusted under 35 U.S.C. 154(b) by 180 days.

(21) Appl. No.: 15/264,228

(22) Filed: Sep. 13, 2016

(65) Prior Publication Data

US 2018/0073929 A1    Mar. 15, 2018

(51) Int. Cl.
*G01J 5/00* (2006.01)
*G01J 5/02* (2006.01)
*G01J 5/60* (2006.01)

(52) U.S. Cl.
CPC ............ *G01J 5/0018* (2013.01); *G01J 5/025* (2013.01); *G01J 5/602* (2013.01); *F23N 2029/00* (2013.01); *G01J 2005/0077* (2013.01)

(58) Field of Classification Search
CPC .... G01J 5/505; G06K 9/3233; F23N 2029/08; F23N 2029/04; F23N 2041/20; F23N 2029/00
USPC ... 374/120, 121, 137, 166, 29, 30, 110, 111, 374/112, 2
See application file for complete search history.

(56) References Cited

U.S. PATENT DOCUMENTS

| | | | | |
|---|---|---|---|---|
| 3,576,556 A | * | 4/1971 | Sellors, Jr. | F23N 5/123 340/579 |
| 4,389,124 A | * | 6/1983 | Longenecker | G01K 3/005 345/46 |
| 6,111,511 A | * | 8/2000 | Sivathanu | G08B 17/12 250/336.1 |
| 7,375,973 B2 | * | 5/2008 | Nuovo | H04M 1/0249 361/736 |
| 8,559,713 B2 | * | 10/2013 | Watanabe | H04N 1/6027 382/167 |
| 9,299,307 B2 | * | 3/2016 | Hiraga | G09G 3/002 |
| 2007/0284532 A1 | * | 12/2007 | Nakanishi | G01J 3/36 250/339.02 |

(Continued)

FOREIGN PATENT DOCUMENTS

CN    201726787 U   *  2/2011
CN    106323977 A   *  1/2017
(Continued)

*Primary Examiner* — Gail Kaplan Verbitsky
(74) *Attorney, Agent, or Firm* — Arch & Lake LLP (57) ABSTRACT

System and method for measuring flame temperature profile are disclosed. The temperature measurement system disclosed measures temperature profile of coal burner flames in a multi-burner furnace environment by capturing temperature images using optical devices. Any point or area of temperature captured in the image is determined by the ratio of the magnitude of the near infrared (NIR) light and the visible red light of that particular point or area, from which the temperature distribution of burner flame is developed. The two light ratio method can minimize the impact on the flame temperature measurement caused by the flame soot in a furnace and thus can greatly improve the temperature measurement accuracy.

14 Claims, 6 Drawing Sheets

(56) References Cited

U.S. PATENT DOCUMENTS

| | | | |
|---|---|---|---|
| 2009/0001269 A1* | 1/2009 | Tadano | H04N 5/247 |
| | | | 250/330 |
| 2012/0290519 A1* | 11/2012 | Fontaine | G01T 1/2985 |
| | | | 706/20 |
| 2013/0093929 A1* | 4/2013 | Kouyama | H04N 9/735 |
| | | | 348/273 |
| 2014/0232714 A1* | 8/2014 | Hiraga | G09G 3/002 |
| | | | 345/214 |
| 2016/0097680 A1* | 4/2016 | Bietto | F23N 5/082 |
| | | | 356/43 |
| 2017/0148184 A1* | 5/2017 | Kraus | G06T 7/60 |
| 2017/0284869 A1* | 10/2017 | Dubbs | G01J 5/505 |
| 2017/0357058 A1* | 12/2017 | Boguszewski | F23M 11/045 |
| 2018/0073928 A1* | 3/2018 | Nakaya | G01J 5/00 |

FOREIGN PATENT DOCUMENTS

| | | | |
|---|---|---|---|
| JP | 407092159 A | * | 4/1995 |
| JP | 4006657 B2 | * | 11/2007 |
| JP | 616417382 A | * | 7/2014 |
| JP | 2016030850 A | * | 3/2016 |

* cited by examiner

SYSTEM AND METHOD FOR MEASURING COAL BURNER FLAME TEMPERATURE PROFILE USING OPTICAL DEVICE

FIELD OF DISCLOSURE

The subject matter disclosed within relates generally to temperature measurement, and particularly relates to a system and method for measuring coal burner flame temperature profile in a multi-burner furnace environment.

The technique uses optical device to obtain temperature images of the target burner flame and determines the temperature by the ratio of two lights emitted from the coal flame.

The technique provides live views and constant updates of the burner flame temperature data, and generates temperature distribution statistics for the burner flame area or for any particular region(s) of interest in the flame image chosen by the user. The disclosed technique displays comparisons of flame temperature data within the image, or between the burners on the same level, or burners from the same corner or among all the burners in a furnace.

BACKGROUND

Traditional boiler temperature measuring devices measure temperatures for a certain spot, which can't precisely determine the temperature distribution information in a multi-burner furnace environment.

The objective of the disclosure is using 2-CCD multi-spectral imaging technology having two channels, simultaneously captures two light images to generate precise flame temperature images of any targeted coal burner in a multi-burner boiler environment. The two light ratio method can minimize the impact on the flame temperature measurement caused by flame soot and thus can greatly increase the temperature measurement accuracy.

With the detailed temperature information from points to areas inside a furnace, measures can be taken to adjust the burner outputs to balance the temperature distribution inside the furnace to improve the combustion performance and reduce pollutant emission.

BRIEF SUMMARY OF THE DISCLOSURE

The present disclosure provides a system and a method for measuring coal burner flame temperature.

In one aspect, a system for measuring a flame temperature is provided. The system may include an optical device, a processor that is coupled with the optical device via a communication network, and a non-transitory computer readable medium storing processing instructions, where the processing instructions, when executed, may cause the processor to capture image data of a flame area by using the optical device where the optical device is installed to aim at the flame area, extract pixels of the red light and near infrared light from the same area in the captured image and determine the flame temperature of that area by the ratio of the magnitude of red light and the magnitude of near infrared light, and display it as well as the flame temperature statistic information in a user interface.

In yet another aspect, the present disclosure provides a method of measuring a flame temperature. The method may include capturing image data of a flame area by using an optical device where the optical device is installed to aim at the target burner flame, extracting pixels of the red light and near infrared light from the same area in the captured image and determining the flame temperature of that area by the ratio of the magnitude of red light and the magnitude of near infrared light, and displaying the flame temperature in a user interface.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF DRAWINGS

The disclosure will be better understood and features, aspects and advantages other than those set forth above will become apparent when consideration is given to the following detailed description thereof. Such detailed description makes reference to the following drawings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF THE DISCLOSURE

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein are for the purpose of description and should not be regarded as limiting. Furthermore, the use of "right," "left," "front," "back," "upper," "lower," "above," "below," "top," or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted,"

"connected," "supported," and "coupled" and variations thereof are used broadly and encompass both direct and indirect mountings, connections, supports, and couplings. Further, "connected" and "coupled" are not restricted to physical or mechanical connections or couplings.

The present disclosure provides a method of using temperature detector, such as an optical device camera, to collect the Near Infrared light (NIR) and Red pixel information from coal burner flame and a two light temperature measurement algorithm which compares the magnitude of Near Infrared light (NIR) with the magnitude of visible red light from flame and uses the ratio of the two to determine the flame temperature.

The relative brightness of two different color lights seen from a material is used to determine the material's temperature. The two light ratio method can minimize the impact on the flame temperature measurement caused by flame soot and thus can greatly increase the temperature measurement accuracy.

For the temperature ranges of coal flame, red and Near Infra-Red (NIR) lights have the necessary data needed for processing, so the red and infrared wavelengths are compared to determine the coal flame temperature. Also, different wavelengths have different levels of light power, and the power levels change over the wave lengths as the temperature change.

In sum, it is to determine the flame temperature by using the ratio of the magnitude of Near Infrared (NIR) light and magnitude of visible red light from the flame.

In addition, the present disclosure discloses the wave lengths between 622-1000 nm are the range the temperature detector captures from the target flame area, which are the characteristic wavelength ranges for coal flame.

In the present disclosure, with the detailed temperature information from points to areas inside a furnace, measures can be taken to adjust the burner outputs to balance the temperature distribution inside the furnace to improve the combustion performance.

Figure 1:
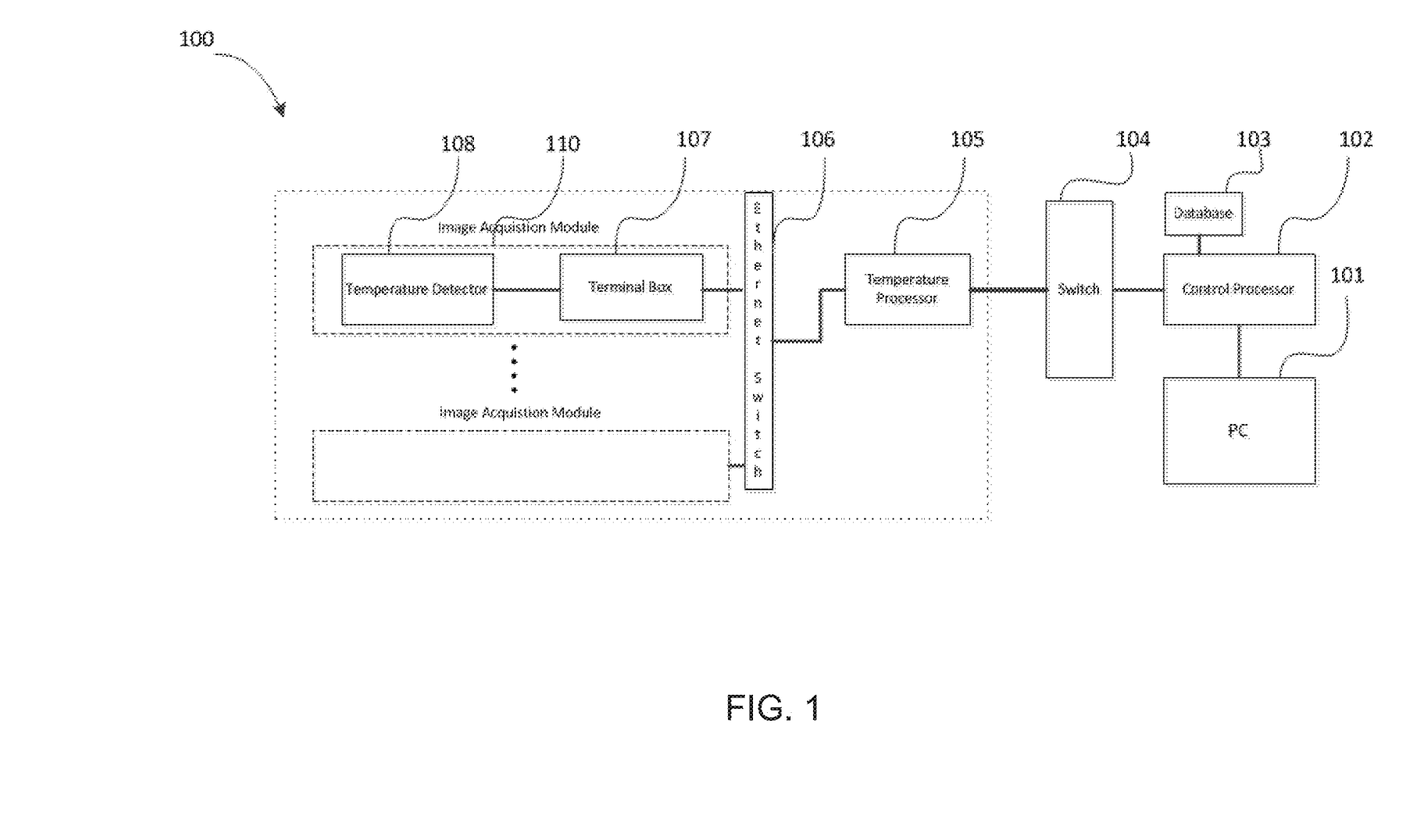
FIG. 1 illustrates a block diagram of flame temperature measurement system.

FIG. 1 illustrates a block diagram of a flame temperature measuring system. The system includes a personal computer (PC) 101, a control processor 102, a database 103, a switch 104, a temperature processor 105, and multiple image acquisition modules 110. The Ethernet switch 106 is used to connect the image acquisition module 110 with the switch 104 through the temperature processor 105. The system 100 has multiple image acquisition modules 110 and each image acquisition module includes a temperature detector 108 and a terminal box 107. The temperature detector 108 may be an optical device and the terminal box 107 contains the control and monitoring wiring connections needed by the temperature detector. It also contains the temperature detector power wiring, command and data Ethernet connections.

Figure 6:
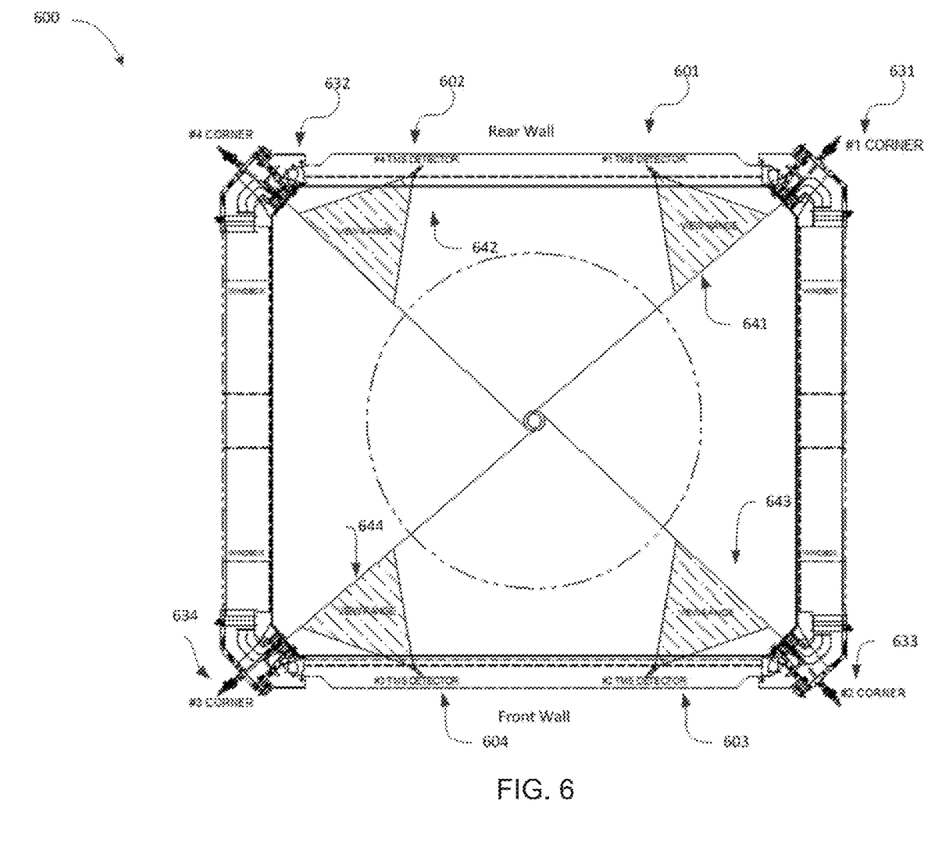
FIG. 6 shows an example installation drawing of temperature detectors on a Tangentially-fired boiler.

Each temperature detector 108 shall be positioned to the target burner flame area, such as 641 in FIG. 6, refer to FIG. 6 for further details. The Ethernet switch 106 receives switch instructions from the switch 104 through the temperature processor 105. The switch instructions can be generated either from the switch 104 or the control processor 102. The switch instructions may control one or multiple image acquisition module(s) to capture image data at the same time or at different times. The user interface in PC 101 allows users to enter a temperature measurement requirement and the requirement may be translated into instructions from the control processor 102. The switch instructions may be sent by the switch 104 to the Ethernet switch 106 through the temperature processor 105 to control the capturing of image data by using one or multiple image acquisition modules 110.

The optical device used may be calibrated. For example, when the detected infrared pixel values by using an optical device are constantly lower than the correct infrared values, the optical device itself should be calibrated to adjust the detected infrared pixel values to higher values according to the corrected infrared pixel values. Also, the optical device calibration includes the pixel value adjustments for visible colors such as a red color. After being calibrated, the optical devices can then be used for further capturing flame images.

The temperature processor 105 takes image data from the temperature detector and processes them into flame temperature images, and generates flame temperature statistics which are sent to database 103 for storage and to PC 101 for display.

The database 103 stores historical data for the determined flame temperature. The stored image data may include flame temperature status data and image data's location that indicates where the actual image data are stored. All determined flame temperatures for multiple flame areas and/or for multiple burners may be stored to the database too. Data stored in the database may be for a pre-determined period of time. For example, processing instructions may cause the processor to store historical data for a period that can be configured by a user. As such, any data that are older than 90 days may be deleted from the database. The stored historical data may be retrieved and displayed in the user interface 101 to compare with the currently determined flame data to show the historical trend of the flame temperature.

The user interface PC 101 also displays warning signals or alarm alerts to the user. Alarms will be displayed in the user interface when the image data for a flame area can not be captured, or the captured flame temperature beyond a pre-determined temperature range, or when a temperature detector becomes faulty, etc.

Figure 2:
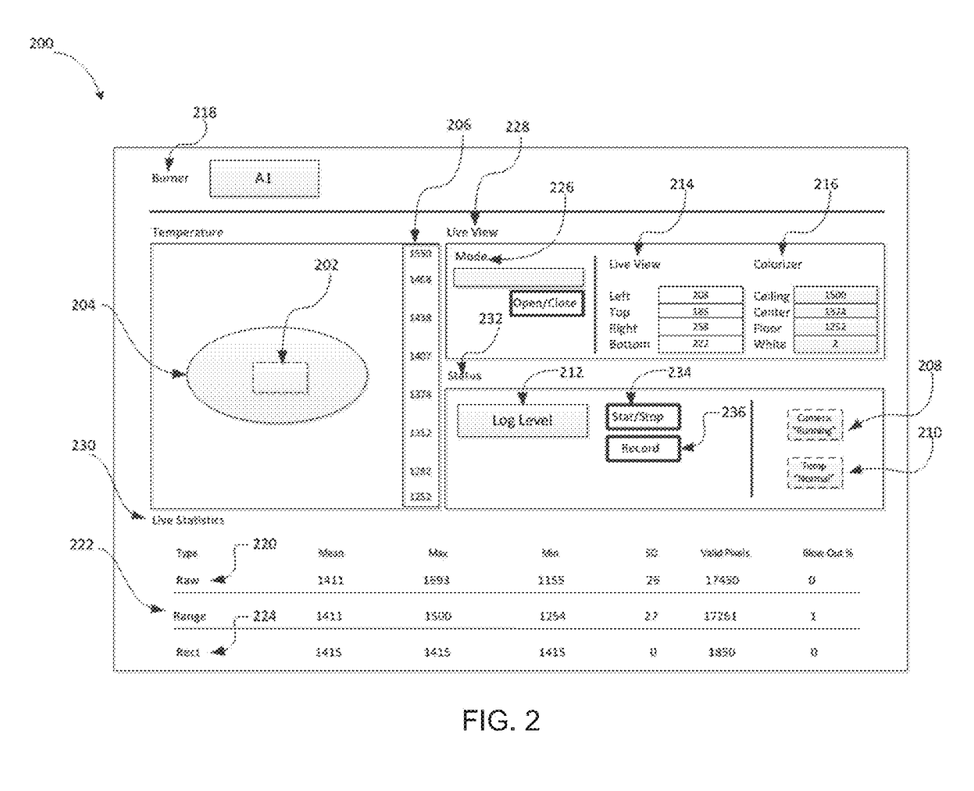
FIG. 2 illustrates an example display of flame temperature information for one single burner.

FIG. 2 shows an example display for a single burner flame temperature information. As shown in FIG. 2, an oval area 204 is a colorized representation of the flame temperature for a burner A1 218. A colored vertical bar 206 shows different colors representing various temperatures in the oval area 204. The temperatures in the bar 206 are represented in a gradually increasing way from the bottom to the top.

A user can choose one or more regions of interest (ROI) for further temperature details. The regions are zoomable. As shown in FIG. 2, a rectangular region 202 is selected with its location information displayed in Rect section 214 under live view 228 and its temperature information displayed in Rect section 224 under live statistics 230. In live view 228, the selected region's coordinates of left, top, right and bottom are shown, which show 208, 185, 258 and 222 respectively. In live statistics 230, the temperature information for the selected rectangular region 202 includes the mean temperature, the maximum temperature and minimum temperature, being all 1415° C. in this case, which means the temperature for the region 202 is uniformly distributed. FIG. 2 also shows that there are 1850 valid pixels extracted and evaluated for the selected area 202. The standard deviation (SD) for the temperature in the selected area 202 is 0 and no evaluated pixels are invalid as the blown out rate is 0%.

Live statistics section 230 also displays other information such as raw image data 220 and the range data 222. The raw data 220 has the mean temperature of 1411° C., the maximum temperature of 1693° C. and the minimum temperature of 1155° C. The raw data 220 include 17,450 valid pixels and 0 pixels are dropped out with 0% blown out rate. The standard deviation of temperature for the raw data 220 is 26.

From the interface 200, users are allowed to select a temperature range for evaluation. For example, the floor and ceiling temperatures for the range 222 are set to 1252 and 1500 as shown in Colorizer 216 in live view 228 in FIG. 2. As shown in Range section 222 of live statistics 230, 17,261 valid pixels are extracted and evaluated out of 17, 450 raw pixels values. The mean, maximum and minimum temperatures are 1411, 1500 and 1254 respectively. The standard deviation of temperature for the range 222 is 27. As those pixels outside the selected range are not evaluated, 189 pixels in the raw data are dropped out and the blown out rate for the range 222 is 1%.

The user interface 200 allows the selection of display mode 226 and status display 232. The mode 226 in live view 228 allows a user to select the display mode in the oval area 204. The oval area 204 in FIG. 2 is for illustration purpose, the actual display in the oval area 204 may be a target flame, which may be a 3-D image for the flame area. FIG. 2 also provides a status section 232 where an optical device status 208 is shown. When the status shows "Running", it indicates that the one optical device used for capturing image data functions correctly and the image data can be captured. The status of flame 210 also shows in the status section 232. When the status shows "Normal", which indicates the flame temperatures are in a proper range defined by the user. For example, if a user defines the normal range for the temperature is 1200-1800° C., the "Normal" status indicates that the measured temperature is within this range. The status may also be in "Fault" status which indicates that the temperature is beyond the pre-determined temperature range. The status section 232 also includes a log level 212 feature. The log level is to log all information associated with the current temperature distribution. The button 236 is to enable the backend system to record flame status data according to the time period selected by the user. In FIG. 2 the status section also provides a start/stop button 234, which is used to control the starting and stopping of the optical device to capture image data.

Figure 3:
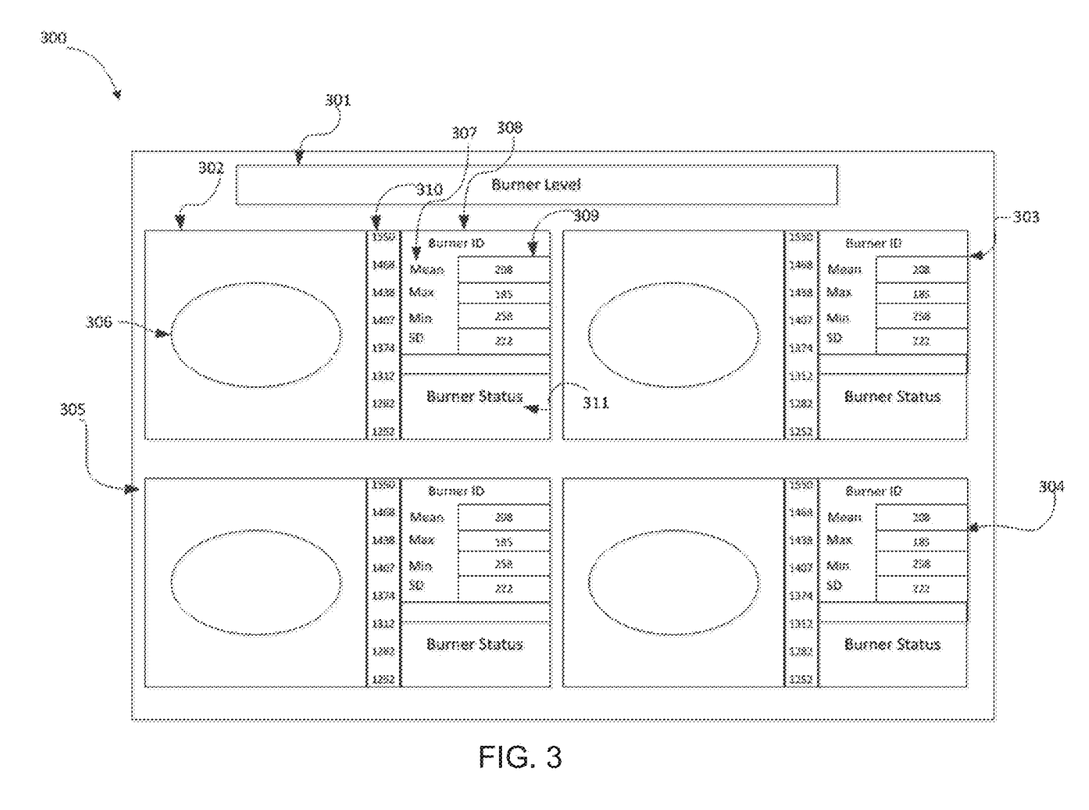
FIG. 3 illustrates an example display of flame temperature information for multiple burners installed on the same level.

FIG. 3 shows an example user interface for displaying the flame temperature of burners on the same boiler level. The display provides an overview of the flame temperature profiles of the four burners 302, 303, 304 and 305 on the same level. As shown in FIG. 3, an oval area 306 is a colorized representation of the flame temperature for a burner 302. A colored bar 310 shows different colors that may represent different temperatures in the oval area 306. The burner level 301 indicates that the level of the burners is located in a boiler, where there are multiple levels of burners. The status of burner 306 also shows in the status section 311. The status of burner 306 may include flame temperature status and optical device status. Statistical parameters 307 and values 309 are displayed as temperature information for burner 302, which includes the live temperature statistic information such as the mean temperature, the maximum temperature, minimum temperature and SD. The burner ID is also included in this section. Clicking on the flame image 306 will lead to a more detailed display for this burner, as illustrated in FIG. 2.

Figure 4:
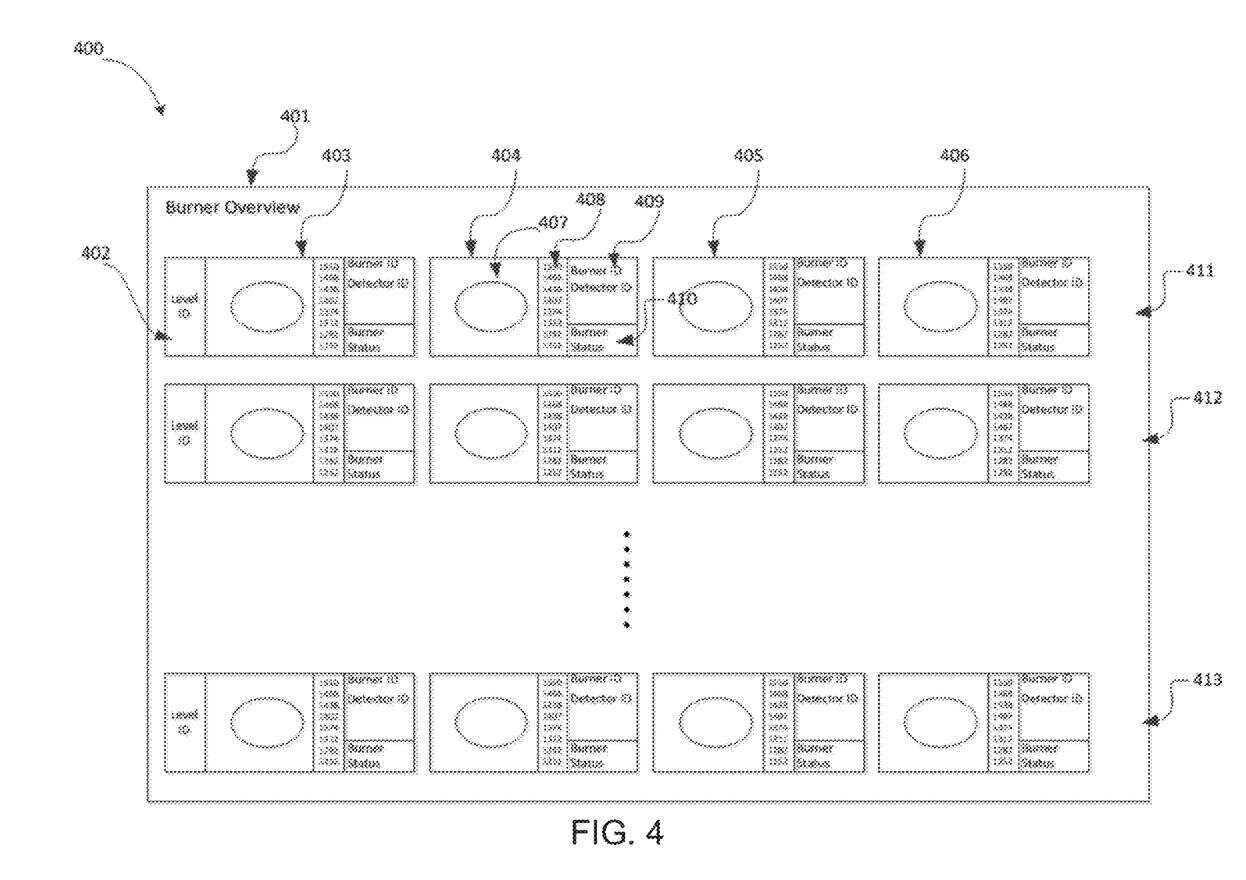
FIG. 4 shows an overview of all the burner flame temperature information in a furnace.

FIG. 4 shows an example overview of all the burner flame temperature information in a boiler. The overview may be displayed in a computer such as a PC. As shown in FIG. 4, the overview page 400 displays flame temperature images and statistics of all the burners in a furnace, where users can see and compare the overall flame performance so that burner outputs can be adjusted to balance the temperature distribution inside the furnace.

In FIG. 4, the level identification (ID) 402 indicates the level where the burner is located. In FIG. 4, level 402 has 4 burners 403, 404, 405 and 406. In this overview 400, there are burner levels from 411 to 413. For burner 404 on level 411, an oval are 407 is a colorized representation of the flame temperature for burner 404. A colored bar 408 shows different colors representing different temperatures in the oval area 407. The burner details 409 include the optical device ID and burner ID for the burner 404. The burner status 410 displays temperature status and optical device status.

Figure 5:
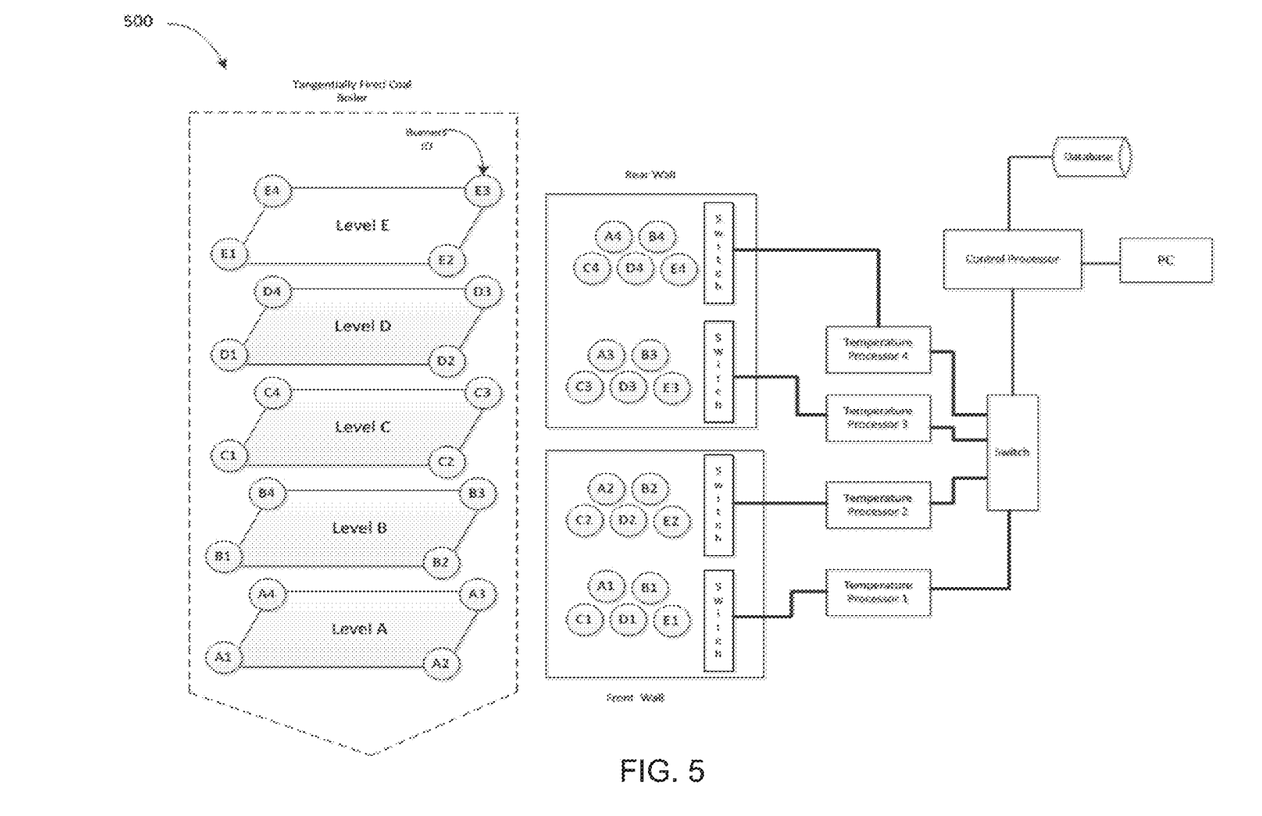
FIG. 5 illustrates an example system drawing for a Tangentially-fired boiler application.

FIG. 5 shows an example drawing of the temperature measurement system applied on a sub critical tangentially-fired, balanced draft boiler. As shown in FIG. 5, there are 5 levels of coal burners with one coal burner at each corner on each level. 10 temperature detectors are installed on each of the front and rear walls. Each temperature detector shall be installed aiming at the firing zone of the target coal burner as shown in FIG. 6.

As illustrated in FIG. 5, there is one flame temperature processor for the 5 temperature detectors installed near the corner on each level. The temperature processor receives temperature image data from the 5 detectors and generates two dimensional temperature images and flame statistics including the maximum temperature, minimum temperature and mean temperature. The control processor receives the flame temperature images and statistics from the 4 temperature processors. All the image data are archived in the database and can be retrieved when needed. The system may send all the live flame temperature images and statistics to a computer such as a personal computer (PC) as illustrated in FIG. 5.

FIG. 6 illustrates an example installation drawing of temperature detectors on one level of a tangentially-fired boiler. As shown in FIG. 6, for a tangentially-fired boiler, temperature detectors shown as TMS detectors are installed on the front and rear walls. Each temperature detector shall be positioned to aim at the firing zone of the target burner.

As shown in FIG. 6, for a tangentially-fired boiler, temperature detectors 601, 602, 603 and 604 are installed on the front and rear walls in pairs. Each temperature detector, such as 601, 602, 603, 604 may be positioned to aim at their own monitoring firing zone 641, 642, 643, 644 of the target burner 631 632, 633 and 634 respectively. Each temperature detector can detect the flame temperature in the firing zone 641, 642, 643 and 644.

In sum, the present disclosure discloses a method and a system for measuring coal flame temperature by capturing two light spectral images that can be converted into temperature maps, based on which the characteristics and flame distribution of any individual burner can be identified and analysed to be used to balance combustion inside furnace and ultimately help to optimize the combustion efficiency and reduce emissions. The present disclosure is also the first application of measuring temperature distribution in a furnace environment with the 2-CCD multi-spectral imaging technology. The 2-CCD multi-spectral imaging technology may use 2-CCD multi-spectral cameras, where the 2-CCD multi-spectral camera may have at least two channels.

In operation, equipped with such detailed and real-time information, an operator may "see" which part of the combustion in a furnace should be adjusted. The operator may adjust corresponding burners to obtain the optimum fuel/air ratio. The details of flame temperature data and related information are the key for balancing the temperature distribution in a furnace.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the disclosure. It will be recognized, however, that the embodiments may be practiced without one or more of the specific details, or with other methods, components, materials, and so forth. In other instances, well-known structures, materials, or operations are not shown or described in detail to avoid obscuring aspects of the disclosure.

Although the above discussion discloses various exemplary embodiments of the disclosure, it should be apparent that various modifications can be made to achieve some of the advantages of the disclosure without departing from the true scope of the disclosure.

I claim:

1. A system for measuring flame temperature profile, comprising:
   an optical device;
   a processor that is coupled with the optical device via a communication network; and
   a non-transitory computer readable medium storing processing instructions, wherein the processing instructions, when executed, cause the processor to:
   capture image data of a target flame area by using the optical device, wherein the optical device is installed to aim at the target flame area;
   extract pixels of both visible red light and invisible near-infrared light from the captured image of the target flame area, and adjust the extracted pixels by calibration of the optical device, wherein the optical device is calibrated when either a detected infrared or red pixel value is different from a correct infrared or red pixel value, wherein both the detected infrared and red pixel values and the correct infrared and red pixel value are stored in a data storage;
   determine a flame temperature based on a ratio of brightness of invisible Near Infrared (NIR) light and brightness of visible red light of the target flame area after the pixels are collected; and
   display the flame temperature on a personal computer (PC) interface wherein a mode of the optical device and a status of the flame temperature for the target flame area are displayed, and the mode shows an operation status of the optical device and the status of the flame temperature shows whether or not the flame temperature in the target area is in a pre-defined range.

2. The system of claim 1, wherein the optical device is a multi-spectral optical device, and both the visible red light and the invisible near-infrared light are characteristic wavelengths of coal flame.

3. The system of claim 1, wherein the processor processes the image data from the optical device, determines the flame temperature of the target flame area and develops temperature distribution statistics for the target flame area, the temperature distribution statistics comprising a maximum temperature, a minimum temperature and a mean temperature, wherein the maximum temperature, the minimum temperature and the mean temperature are generated for the target flame area of a particular burner, or for a region of interest (ROI) in a flame image chosen by a user.

4. The system of claim 1, the PC interface is used for users to give instructions, set requirements, choose a user-defined region of interest (ROI) inside the target flame area, view current and historical temperature data, compare flame temperature profiles between two or more burners on a same level or a same corner in a furnace.

5. The system of claim 1, wherein the flame temperature has a range that is set under various combustion conditions.

6. The system of claim 1, wherein multiple optical devices are used to capture the image data of multiple burners in a multi-burner furnace, wherein each optical device is positioned to aim at an individual burner.

7. The system of claim 6, wherein each optical device is selected to work individually.

8. A method for measuring flame temperature profile, comprising:
   capturing a flame image by using an optical device, wherein the optical device is aimed at a target burner flame area;
   extracting pixel values of a visible red light and an invisible Near Infrared (NIR) light from a same area in the captured flame image and adjusting the extracted pixel values by calibration of the optical device, wherein the optical device is calibrated when either a detected infrared or red pixel value is different from a correct infrared or red pixel value, wherein both the detected infrared and red pixel values and the correct infrared and red pixel value are stored in a data storage;
   generating a ratio of brightness of the invisible NIR light and brightness of the visible red light for a particular area within the captured flame image;
   converting the ratio of the invisible NIR light and the visible red light into a temperature for the particular area;
   determining a temperature distribution profile using temperature information from the captured flame image after the pixel values are collected; and
   displaying the temperature distribution profile via a personal computer (PC) interface wherein a mode of the optical device and a status of the flame temperature for the target flame area are displayed, and the mode shows an operation status of the optical device and the status of the flame temperature shows whether or not the flame temperature in the target area is in a pre-defined range.

9. The method of claim 8, further comprising developing temperature distribution statistics for the target burner flame area or a region of interest (ROI), wherein the temperature distribution statistics comprise a maximum temperature, a minimum temperature and a mean temperature.

10. The method of claim 8, wherein the PC interface is configured to display a colorization representation of the temperature information.

11. The method of claim 8, further comprising selecting a user-defined ROI inside the flame image for obtaining the temperature information of the user-defined ROI, wherein the user-defined ROI is zoomable.

12. The method of claim 8, further comprising setting temperature measurement ranges for various combustion conditions.

13. The method of claim 8, wherein the PC interface is configured to generate an alarm when the temperature is outside a predetermined temperature range, or when the temperature is not determinable, or when the optical device becomes faulty.

14. The method of claim 8, wherein the optical device comprises multiple optical devices that are used to capture flame images of multiple burners in a multi-burner furnace, wherein each optical device is positioned aiming at an individual target burner flame area.

* * * * *